United States Patent [19]

Mukherjee

[11] 4,405,349

[45] Sep. 20, 1983

[54] INDIRECT-DIRECT FREEZE EXCHANGE CONCENTRATOR AND METHOD

[75] Inventor: Shib P. Mukherjee, Naperville, Ill.

[73] Assignee: Chicago Bridge & Iron Company, Oak Brook, Ill.

[21] Appl. No.: 380,110

[22] Filed: May 20, 1982

[51] Int. Cl.³ .............................................. B01D 9/04
[52] U.S. Cl. ....................................... 62/532; 62/124
[58] Field of Search ................ 62/532, 542, 544, 123, 62/124

[56] References Cited

U.S. PATENT DOCUMENTS 4,314,455 2/1982 Engdahl ................................ 62/532

Primary Examiner—Frank Sever
Attorney, Agent, or Firm—Merriam, Marshall & Bicknell

[57] ABSTRACT

A freeze concentration apparatus comprising a warm concentrator tank; a conduit to deliver an aqueous liquid mixture feed stream to the warm concentrator tank; a cold concentrator tank; a conduit to feed the liquid mixture from the cold concentrator tank to a primary freeze exchanger for indirect cooling by heat exchange to a cold fluid to form ice crystals in the liquid mixture; a conduit to feed the liquid mixture containing ice crystals from the primary freeze exchanger to the cold concentrator tank; a conduit to withdraw liquid mixture from the cold concentrator tank concentrated by the freezing of water therefrom; a conduit to withdraw an ice slurry from the cold concentrator tank and deliver it to the warm concentrator tank; a conduit to withdraw an ice slurry from the warm concentrator tank and deliver it to an ice slurry washer; a spray system to wash the ice slurry in the washer with water and to collect washed ice and an aqueous mixture; a conduit to remove the aqueous mixture from the washer and deliver it to the cold concentrator tank; and an unloader to remove the washed ice from the washer.

10 Claims, 1 Drawing Figure

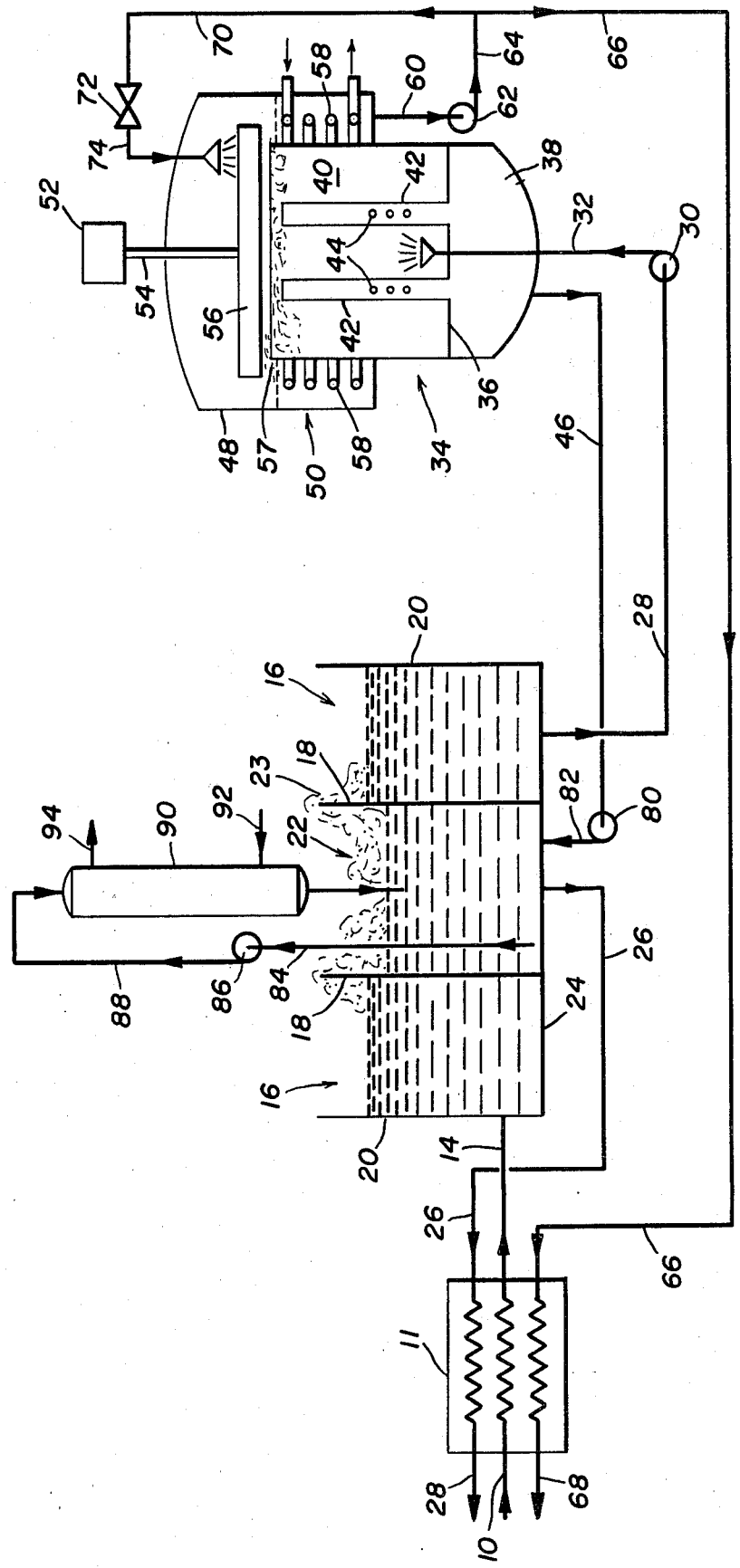

INDIRECT-DIRECT FREEZE EXCHANGE CONCENTRATOR AND METHOD

This invention relates to apparatus for, and methods of, concentrating a liquid mixture such as fruit and vegetable juices, seawater, brackish water, waste water, and chemical solutions and dispersions, by freezing a portion of the solvent, usually water.

BACKGROUND OF THE INVENTION

It is often necessary, or at least desirable, to concentrate a liquid mixture by removing a portion of the solvent, generally water, from the liquid mixture. The resulting product, therefore, is in a more concentrated form. It has been common to concentrate radioactive waste (rad waste), cooling tower blow down waste water, fruit and vegetable juices such as orange juice, grapefruit juice, grape juice, and tomato juice by evaporation to remove water. In addition, seawater and brackish water have been concentrated by evaporation, although the condensed vapor has been recovered as usable potable water rather than discarded as in concentrating fruit and vegetable juices. Nevertheless, each is a concentrating process. In the case of juice, the concentrate is the desirable product; whereas, in obtaining potable water from seawater or brackish water the concentrate is discarded.

Evaporative concentration as described, as well as evaporation of chemical solutions or liquid dispersions, requires substantial energy since it relies on the latent heat of vaporization. Scaling of equipment and enhanced corrosion are often inherent at the temperatures involved in evaporative concentration. Loss of flavor and aroma also result during evaporative concentration of food products.

Because of the shortcomings involved in evaporative concentration, it has been found advantageous to freeze concentrate many products, particularly those having water as the liquid carrier. Generally, reduced energy is required since freeze concentrating relies on the heat of fusion instead of the heat of evaporation. In such a process, water is removed by first producing ice crystals which are then separated from the concentrate. Next, the ice crystals are washed to remove the remaining concentrate on them. The ice crystals can then be discarded or melted if potable water is desired.

Engdahl U.S. Pat. No. 4,314,455 discloses a freeze concentration apparatus and process. In FIG. 2 of that patent a two stage freeze concentration system is disclosed. The system employs a second freeze exchanger to cool liquid in a second or warm concentrator vessel thus increasing capital cost. In addition, the aqueous mixture which is separated from the ice formed in the process is recirculated to the warm concentrator from which it is subsequently pumped to the primary or first freeze exchanger. This approach utilizes a pump and extra energy which desirably should be avoided if possible.

SUMMARY OF THE INVENTION

According to one aspect of the invention there is provided a freeze concentration apparatus comprising a warm concentrator tank; a conduit means to deliver an aqueous liquid mixture feed stream to the warm concentrator tank; a cold concentrator tank; conduit means to feed a liquid mixture from the cold concentrator tank to a primary freeze exchanger for indirect cooling by heat exchange to a cold fluid to form ice crystals in the liquid mixture; means to feed the liquid mixture containing ice crystals from the primary freeze exchanger to the cold concentrator tank; conduit means to withdraw liquid mixture from the cold concentrator tank concentrated by the freezing of water therefrom; means to withdraw an ice slurry from the cold concentrator tank and deliver it to the warm concentrator tank; means to withdraw ice slurry from the warm concentrator tank and deliver it to an ice slurry washer; means to wash the ice slurry in the washer with water and to collect washed ice and an aqueous mixture; conduit means to remove the aqueous mixture from the washer and deliver it to the cold concentrator tank; and means to remove the washed ice from the washer.

The freeze concentration apparatus desirably includes a washed ice melter; means to deliver the washed ice, removed from the washer, to the melter; and means to withdraw cold water from the melter and use it to precool the feed stream fed to the warm concentrator tank. For example, a conduit can feed cold water from the melter through a heat exchanger countercurrent to flow therethrough of the liquid mixture feed stream.

The freeze concentrator apparatus can also comprise a heat exchanger; conduit means to feed the aqueous liquid mixture feed stream through the heat exchanger and then to the warm concentrator tank; and conduit means to feed concentrated liquid mixture, from the cold concentrator tank, through the heat exchanger countercurrent to flow therethrough of the liquid mixture feed stream.

According to a second aspect of the invention, a method is provided comprising delivering an aqueous liquid mixture feed stream to a warm concentrator tank; feeding a liquid mixture from a cold concentrator tank to a primary freeze exchanger for indirect cooling by heat exchange to a cold fluid to form ice crystals in the liquid mixture; feeding the liquid mixture containing ice crystals from the primary freeze exchanger to the cold concentrator tank; withdrawing liquid mixture from the cold concentrator tank concentrated by the freezing of water therefrom; withdrawing an ice slurry from the cold concentrator tank and delivering it to the warm concentrator tank; withdrawing an ice slurry from the warm concentrator tank and delivering it to an ice slurry washer; washing the ice slurry in the washer with water and collecting washed ice and an aqueous mixture; removing the aqueous mixture from the washer and delivering it to the cold concentrator tank; and removing the washed ice from the washer.

The method can include a step of delivering the washed ice, removed from the washer, to a melter and withdrawing water from the melter. Cold water from the melter can be fed from the melter through the heat exchanger counter-current to flow therethrough of the liquid mixture feed stream.

It is desirable in practicing the method to feed the aqueous liquid mixture feed stream through a heat exchanger and then to the warm concentrator tank; and then to feed a concentrated liquid mixture, from the cold concentrator tank, through the heat exchanger countercurrent to flow therethrough of the liquid mixture feed stream.

The described apparatus and method avoids use of a second freeze exchanger to cool the liquid or slurry in the warm concentrator, thereby minimizing capital investment. Cooling for the liquid or slurry in the warm concentrator is provided by the ice which is conveyed from the cold concentrator to the warm concentrator. Since that ice is maintained at least 10° F. below the freezing point of the warm concentrator contents, it supplies a cooling effect in the warm concentrator. Some of the inlet feed stream desirably first cooled to just above the freezing point of the feed stream in a heat exchanger, is cooled by the ice crystals to form additional ice in the warm concentrator thereby increasing the efficiency of the system. In addition, by draining off the liquid from the ice in an ice slurry washer and feeding that liquid, which is close to the freezing point of water, directly to the cold concentrator, increased efficiency and cooling is achieved. Furthermore, only one pump need be used to transfer the liquid from the washer to the cold concentrator, whereas if the liquid is transferred from the washer to the warm concentrator and then from it to the freeze exchanger, a second pump would be needed.

BRIEF DESCRIPTION OF THE DRAWING

The drawing shows schematically freeze concentration apparatus provided by the invention.

DETAILED DESCRIPTION OF THE DRAWING

With reference to the drawing, a liquid mixture feed stream is fed by conduit 10 to heat exchanger 11. The liquid mixture, cooled to just above the freezing point of the aqueous mixture, exits from heat exchanger 11 to conduit 14 which delivers it to warm concentrator 16.

The liquid mixture can be seawater, brackish water, orange juice, grapefruit juice, grape juice, tomato juice, a chemical solution or dispersion in water, a waste water such as radioactive aqueous waste from a nuclear power plant or cooling tower blow down water, or some other aqueous liquid which is desirably concentrated. It is to be understood that sometimes the concentrate is the desired product, such as a fruit or vegetable juice. At other times the concentrate is discharged and the ice or water is desired, as in producing potable water from seawater or brackish water.

The warm concentrator 16 is essentially the space between the inner vertical wall 18 and the outer vertical wall 20. The space surrounded by wall 18 defines a cold concentrator 22. Plate 24 forms the bottom of both concentrators.

An ice slurry 23 forms in cold concentrator 22, as will be described hereinafter, and it floats on top of a cold concentrator liquid mixture therein. Liquid concentrate is removed from the cold concentrator 22 by conduit 26 which conducts the cold liquid concentrate to heat exchanger 11. The warmed liquid concentrate is withdrawn from heat exchanger 11 by conduit 28 and delivered to a destination for disposal or further processing as is appropriate.

As ice slurry builds up in cold concentrator 22, it is pushed over the top edge of wall 18 into warm concentrator 16 to which the inlet feed stream is fed, thereby diluting the ice slurry such as from about 40% to 20% solids, thus lowering its viscosity and promoting growth of the ice crystals which facilitates subsequent handling and washing. Most importantly, the ice crystals from the cold concentrator are about 5° F. below the freezing point of water, such as at about 29° F., so that when they combine with the inlet feed stream, which is only slightly above the freezing point of water, in the warm concentrator the feed stream becomes further cooled and more ice is thereby formed thus increasing the efficiency of the system.

Conduit 28 receives ice slurry from warm concentrator 16 and delivers it to pump 30 which feeds it to conduit 32. Conduit 32 delivers the ice slurry to ice washer 34. Ice washer 34 has a horizontal divider 36 which separates it into a lower wash liquid receiving portion 38 and an upper ice receiving portion 40. A plurality of tubes 42 project upwardly from outlets in divider 36. Holes 44 in tubes 42 allow a mixture of the liquid to be concentrated and wash water to drain from the ice receiving portion 40 into tubes 42 and then to liquid receiving portion 38. Conduit 46 delivers the liquid mixture from liquid receiving portion 38 to cold concentrator 22 by means of pump 80 and conduit 82.

The upper part of ice washer 34 is surrounded by shell 48 which defines an ice melter 50. Motor 52 is mounted above the top of shell 48. Shaft 54 extends from motor 52 to scraper blade 56 which rotates slowly. As the level of the ice slurry 57 rises in ice washer 34 it contacts the rotating scraper blade 56 which pushes it out and over the edge of the ice washer into the ice melter 50 containing heating coils 58. A hot fluid is circulated through the heating coils 58 to melt the ice and convert it to cold water. The cold water is removed from ice melter 50 by a conduit 60 which delivers it to pump 62. Conduit 64 conveys the cold water from pump 62 to conduit 66 which feeds the cold water to heat exchanger 11. The warmed water is withdrawn from heat exchanger 11 by conduit 68.

A stream of cold water is diverted from conduit 64 to conduit 70, through valve 72, to conduit 74 from which water is sprayed onto the ice slurry in ice washer 34 to thoroughly wash the ice before it spills over into ice melter 50.

Liquid is removed from the lower portion of cold concentrator 22 by conduit 84 which communicates with pump 86. The liquid contains a low ice fraction, but it has sufficient seed crystals to prevent excessive subcooling of the stream. Conduit 88 delivers the liquid from pump 86 to freeze exchanger 90 in which the liquid is cooled by indirect heat exchange with a cooling fluid circulated therethrough by inlet conduit 92 and outlet conduit 94. The cooling fluid can be a refrigerant such as ammonia or a Freon type fluoroethane refrigerant, or it can be a previously cooled liquid such as ethylene glycol or methanol. As the liquid mixture flows downwardly in freeze exchanger 90 its temperature is lowered sufficiently for ice to crystallize out. Both the ice fraction and crystal size will increase as the stream progresses through the freeze exchanger 90 and new ice crystals form.

The ice-containing mixture flows out the bottom of freeze exchanger 90 into cold concentrator 22. An ice slurry floats on top of the liquid in cold concentrator 22 and spills over into the warm concentrator 16, as described above, where it mixes with and cools the incoming feed stream supplied by conduit 14.

The following example is presented to further illustrate the invention.

EXAMPLE

A fruit juice at 70° F. having a 16% Brix is fed by conduit 10 at a flow rate of 100 lb/hr to heat exchanger 11. The other operating data is shown in the following Table with reference to conditions at various points on the apparatus illustrated by the drawing.

TABLE

| POINT NO. | TEMP. (F.) | FLOW | ICE (LB/HR) | WATER | FRUIT S. | BRIX (%) | ENTHALPY BTU/HR |
|---|---|---|---|---|---|---|---|
| 10 | 70.0 | 100.0 | 0.0 | 84.0 | 16.0 | 16.0 | 3800 |
| 26 | 19.1 | 32.0 | 0.0 | 16.0 | 16.0 | 50.0 | −412 |
| 66 | 33.0 | 68.0 | 0.0 | 68.0 | 0.0 | 0.0 | 38 |
| 28 | 29.0 | 715.6 | 71.6 | 502.5 | 141.7 | 22.0 | −12284 |
| 46 | 29.0 | 647.6 | 0.0 | 505.9 | 141.7 | 21.9 | −1927 |
| 57 | 32.0 | 105.6 | 72.0 | 33.6 | 0.0 | 0.0 | −10320 |
| 23 | 19.1 | 615.6 | 330.0 | 142.8 | 142.8 | 50.0 | −53119 |
| 74 | 33.0 | 37.4 | 0.0 | 37.4 | 0.0 | 0.0 | 37 |
| 14 | 33.6 | 100.0 | 0.0 | 84.0 | 16.0 | 16.0 | 156 |
| 28 | 65.0 | 32.0 | 0.0 | 16.0 | 16.0 | 50.0 | 1056 |
| 68 | 65.0 | 68.0 | 0.0 | 68.0 | 0.0 | 0.0 | |

What is claimed is:

1. A freeze concentration apparatus comprising:
  a warm concentrator tank;
  a conduit means to deliver an aqueous liquid mixture feed stream to the warm concentrator tank;
  a cold concentrator tank;
  conduit means to feed a liquid mixture from the cold concentrator tank to a primary freeze exchanger for indirect cooling by heat exchanger to a cold fluid to form ice crystals in the liquid mixture;
  means to feed the liquid mixture containing ice crystals from the primary freeze exchanger to the cold concentrator tank;
  conduit means to withdraw liquid mixture from the cold concentrator tank concentrated by the freezing of water therefrom;
  means to withdraw an ice slurry from the cold concentrator tank and deliver it to the warm concentrator tank;
  means to withdraw an ice slurry from the warm concentrator tank and without prior cooling in a second freeze exchanger deliver it directly to an ice slurry washer;
  means to wash the ice slurry in the washer with water and to collect washed ice and an aqueous mixture;
  conduit means to remove the aqueous mixture from the washer and deliver it directly to the cold concentrator tank; and
  means to remove the washed ice from the washer.

2. A freeze concentration apparatus according to claim 1 including:
  a washed ice melter;
  means to deliver the washed ice, removed from the washer, to the melter; and
  means to withdraw cold water from the melter and use it to precool the feed stream fed to the warm concentrator tank.

3. A freeze concentration apparatus according to claim 1 comprising:
  a heat exchanger;
  conduit means to feed the aqueous liquid mixture feed stream through the heat exchanger and then to the warm concentrator tank; and
  conduit means to feed concentrated liquid mixture, from the cold concentrator tank, through the heat exchanger countercurrent to flow therethrough of the liquid mixture feed stream.

4. A freeze concentration apparatus according to claim 3 comprising:
  a washed ice melter;
  means to deliver the washed ice, removed from the washer, to the melter;
  means to withdraw cold water from the melter; and
  conduit means to feed cold water from the melter through the heat exchanger countercurrent to flow therethrough of the liquid mixture feed stream.

5. A method comprising:
  delivering an aqueous liquid mixture feed stream to a warm concentrator tank;
  feeding a liquid mixture from a cold concentrator tank to a primary freeze exchanger for indirect cooling by heat exchanger to a cold fluid to form ice crystals in the liquid mixture;
  feeding the liquid mixture containing ice crystals from the primary freeze exchanger to the cold concentrator tank;
  withdrawing liquid mixture from the cold concentrator tank concentrated by the freezing of water therefrom;
  withdrawing an ice slurry from the cold concentrator tank and delivering it to the warm concentrator tank;
  withdrawing an ice slurry from the warm concentrator tank and without prior cooling in a second freeze exchanger delivering it directly to an ice slurry washer;
  washing the ice slurry in the washer with water and collecting washed ice and an aqueous mixture;
  removing the aqueous mixture from the washer and delivering it directly to the cold concentrator tank; and
  removing the washed ice from the washer.

6. A method according to claim 5 including:
  delivering the washed ice, removed from the washer, to a melter; and
  withdrawing water from the melter.

7. A method according to claim 5 including:
  feeding the aqueous liquid mixture feed stream through a heat exchanger and then to the warm concentrator tank; and
  feeding concentrated liquid mixture, from the cold concentrator tank, through the heat exchanger countercurrent to flow therethrough of the liquid mixture feed stream.

8. A method according to claim 5 including:
  delivering the washed ice, removed from the washer, to a melter;
  withdrawing cold water from the melter; and
  feeding cold water from the melter through the heat exchanger countercurrent to flow therethrough of the liquid mixture feed stream.

9. A method according to claim 5 in which the aqueous liquid mixture feed stream is delivered to the warm concentrator tank at a temperature above but close to the freezing point of the liquid feed stream.

10. A method according to claim 9 in which the ice crystals in the ice slurry withdrawn from the cold concentrator tank and delivered to the warm concentrator tank are at least 10° F. below the freezing point of the warm concentrator contents.

* * * * *

UNITED STATES PATENT AND TRADEMARK OFFICE
CERTIFICATE OF CORRECTION

PATENT NO. : 4,405,349
DATED : September 20, 1983
INVENTOR(S) : Shib P. Mukherjee It is certified that error appears in the above-identified patent and that said Letters Patent are hereby corrected as shown below:

Column 2, line 9, after "draw" insert --an--; line 66, change "thereby" to --thereto--; in the Table in column 5, under FLOW change "715.6" to --715.8-- and under ENTHALPY change "38" to --68--; column 6, line 20, change "exchanger" to --exchange--.

Signed and Sealed this

Twenty-second Day of November 1983

[SEAL]

Attest:

GERALD J. MOSSINGHOFF

Attesting Officer  Commissioner of Patents and Trademarks